United States Patent [19]
Mori

[11] Patent Number: 5,409,549
[45] Date of Patent: Apr. 25, 1995

[54] SOLAR CELL MODULE PANEL

[75] Inventor: Masahiro Mori, Kyoto, Japan

[73] Assignee: Canon Kabushiki Kaisha, Tokyo, Japan

[21] Appl. No.: 114,620

[22] Filed: Sep. 1, 1993

[30] Foreign Application Priority Data

Sep. 3, 1992 [JP] Japan .................. 4-235937

[51] Int. Cl.$^6$ .................. E04D 13/18; H01L 31/05
[52] U.S. Cl. .................. 136/244; 52/173.3; 136/251; 136/291
[58] Field of Search .................. 136/244, 251, 291; 52/91.3, 173.3

[56] References Cited

U.S. PATENT DOCUMENTS

| | | | |
|---|---|---|---|
| 4,189,881 | 2/1980 | Hawley | 52/91.3 |
| 4,636,577 | 1/1987 | Peterpaul | 136/206 |
| 5,092,939 | 3/1992 | Nath et al. | 136/251 |
| 5,164,020 | 11/1992 | Wagner et al. | 136/251 |
| 5,232,518 | 8/1993 | Nath et al. | 136/251 |
| 5,252,141 | 10/1993 | Inoue et al. | 136/251 |

FOREIGN PATENT DOCUMENTS 4-67349  10/1992  Japan .

Primary Examiner—Aaron Weisstuch
Attorney, Agent, or Firm—Fitzpatrick, Cella, Harper & Scinto

[57] ABSTRACT

An object of the present invention is to provide a solar cell module panel which is mounted on a roof of a building and united with roof rafters at low cost, whose installation and maintenance can be easily done, and which has long term reliability, especially with respect to protection of the solar cell modules. The solar cell modules of the solar cell module panel are mounted and fixed on the roof rafters, wherein at least one side edge portion of each solar cell module is held and fixed between the roof rafter and a solar cell module fastener member fixed to the roof rafter.

6 Claims, 6 Drawing Sheets

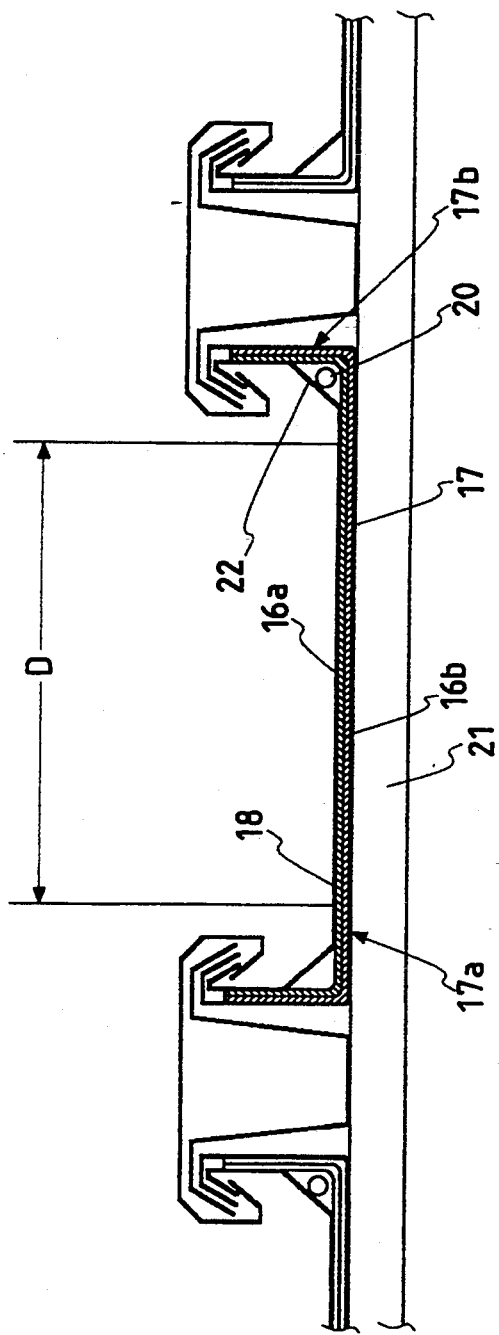

SOLAR CELL MODULE PANEL

BACKGROUND OF THE INVENTION

1. Field of the Invention

The present invention relates to a solar cell module, more specifically, to a solar cell module panel which is installed on a roof of a building or the like at low cost, whose installation and maintenance can be easily done, and which has long-term reliability, especially with respect to protection of the solar cell modules.

2. Related Background Art

Recently, photoelectric conversion devices such as solar cells have been developed to serve as what is called a "clean energy source." Solar cell modules serving as a power source have a plurality of solar cells held between glass plates or the like, or have a thin film solar cell element formed on a substrate such as a stainless steel substrate and encapsulated with a high polymer resin. Such solar cell modules are installed on a foundation such as a roof, wherein an installation base is fixed to rising portions of the roof and the solar cell module is fixed to said installation base. If there are not such rising portions, portions are formed on the roof in order to mount the installation base on which the solar cell modules are mounted.

FIG. 8 shows an example of the above solar cell module mounted on a roof by means of a solar cell installation base. The solar cell installation base 34 is fixed to the tops of protruberances 36, which are seam portions of roof battens, through fastening members 35. At said seam portions, edges of adjacent metal roof rafters are folded together so as to be fastened to each other. Each solar cell module 37 has an aluminum frame. These solar cell modules 37 are fixed to the solar cell installation base 34 with respective fasteners (not shown).

The solar cell modules 37 are electrically connected through connectors 38 provided beneath them.

In the above-mentioned apparatus in which the solar cell installation base is used, since the connectors and cables are provided beneath the solar cell modules, they are not exposed to direct sunlight. Accordingly, the connectors and the cables do not have to be made of relatively expensive weather proof material, which is advantageous for reducing the cost of the connector units. In addition, as the connectors can be hidden beneath the solar cell modules, the external appearance of the installed solar cell modules is good. In this method of installation, however, the material cost and the manufacturing cost of the solar cell installation base cancels out the above-mentioned advantage of the low cost of the connector units, and even make the total cost of this type of installation higher. And the base fixed on the roof of the building is not preferable with respect to its appearance. Further, the solar cell module held between glass plates weighs as much as 13–15 kilograms per square meter, and thus, is hard to handle when set up on the roof, etc., and the heavy installation base must first be fixed on the roof and the solar cell modules then fixed thereon with fasteners such as bolts. Therefore, it takes a long time and is dangerous to set up and mount the solar cell, and the base is expensive.

In order to solve the above-mentioned drawbacks, a method by which the solar cell modules are directly fixed to the roof rafters, as shown in FIG. 9, has been devised.

FIG. 9 shows an example in which the solar cell modules are directly fixed on the roof rafters with double-sided pressure sensitive adhesive tape. This method will be briefly described below with reference to FIG. 9.

Reference numeral 39 indicates a roof rafter, 40 indicates a solar cell module, and 41 is double-sided adhesive coated tape for adhering the solar cell module to the roof rafter. Reference numerals 42, 43, and 44 indicate a connector, a cable, and a junction box for leading out a terminal, respectively. The connector, the cable, and the junction box connect solar cell modules with each other.

In this method, as the solar cell modules are directly fixed to the roof rafters which can give the solar cell modules enough structural strength, the solar cell modules do not have frame and are as flexible as the solar cell elements sealed inside with resin. The solar cell modules are adhered to the roof rafters with double-sided adhesive coated tape, and are electrically connected with each other through said connectors 42 provided on the upper side of the modules.

The method in which the solar cell modules are directly fastened to the roof rafters by means of double-sided adhesive coated tape or the like does not require the solar cell installation base, whose cost can thus be eliminated. In this method, however, the solar cell modules do not have frames but are made of flexible solar cell elements sealed with resin; that is, the edge portions of the modules are not fixed nor protected by fasteners. Thus, if a worker hits a module with a tool or scratches it with a spiked shoe during installation of the solar cell, the module may be damaged; for example, the surface coating material can come off at the edge portion of the module. Accordingly, in order to improve long-term reliability, members for fixing and protecting the edge portions of the modules should be provided.

Further, as shown in FIG. 9, since the clearances between the solar cell modules and the roof rafters, which are provided by the double-sided adhesive coated tape are as narrow as about 1 mm, the connectors cannot be arranged or hidden behind the solar cell modules. Thus, relatively expensive weather proofed connectors must be used. And, when the solar cell module is set up in a windy area, the connectors or the cables have to be fixed with adhesive tapes or the like so that the connector units do not sway in the wind.

In addition, some users are not pleased with the appearance when the connector units are exposed.

As described above, there have been no methods of installing the solar cell modules in which the cost is low and, at the same time, long-term reliability is improved with respect to fixation and protection of the edge portions and electrically connecting units of the solar cell modules, especially with respect to protection of the solar cell modules. Accordingly, a method of installing the solar cell on a roof or the like of a building is desired in which the cost is low and, at the same time, long-termed reliability is improved especially with respect to protection of the solar cell modules.

SUMMARY OF THE INVENTION

The present invention was made to solve the above-mentioned problems. An object of the present invention is to provide a solar cell module panel which can realize lost cost, facility of installation and maintenance, and at the same time, long-term reliability especially with respect to protection of the solar cell module. Said solar cell module panel is to be unitary with a roof rafter, so it can be preferably applied to installation on a roof or the like of a building.

A solar cell module panel according to the present invention comprises: a substrate; a plurality of solar cell modules arranged on said substrate; connecting members for electrically connecting said solar cell modules with each other; and fastener members for fixing said solar cell modules, wherein said connecting members are contained in said fastener members for mounting said solar cell modules, and edge portions of the solar cell modules are held between said substrate and said fastener members which are fixed thereto.

Another solar cell module panel according to the present invention is characterized in that the cross-sectional form of said substrate has flat bottom portions and rising portions, and the solar cell module fastener members are fixed to said rising portions.

Another solar cell module panel according to the present invention is characterized in that said solar cell modules are flexible and are held and fixed to both the flat portions and the rising portions of the roof rafters.

Another solar cell module panel according to the present invention has waterproof sealing members between said solar cell module fastener members and the solar cell modules.

Still another solar cell module panel according to the present invention is characterized in that magnets are used to assist mounting of the solar cell modules to the roof rafters.

And still another solar cell module panel according to the present invention is characterized in that the solar cell modules are fixed to said substrate with the help of double-sided pressure sensitive adhesive coated tape.

Since the solar cell module panel according to the present invention comprising a plurality of solar cell modules; the connecting units for electrically connecting the solar cell modules with each other; and solar cell module fasteners members capable of containing said connecting units, is united with the roof rafters, wherein the solar cell modules are mounted on and fixed to the roof rafters, and since the edge portions of the solar cell modules are held and fixed between the roof rafters and the solar cell module fastener members fixed thereto, the following effects can be obtained.

Because a separate base for installation of the solar cell is not required, the facility and safety of the work can be remarkably improved, and the cost can be reduced. And as the edge portions of the solar cell modules, especially those adjacent to each other, are fixed and protected by the module fastener members, the modules are not mechanically damaged, and long-term reliability is improved.

Further, since the cross-sectional form of the roof rafters has the flat bottom portions and the rising portions and the solar cell module fastener members are fixed to the rising portions of the roof rafters, mounting can be easily carried out without drilling holes through the roof rafters.

In addition, as the solar cell modules can be mounted without drilling holes for bolts, nails, or the like, moisture does not enter the solar cell modules through holes and delamination can be prevented.

Furthermore, the solar cell modules are flexible and are held and fixed to both the flat portions and the rising portions of the roof rafters. That is, each solar cell module is held and fixed by the force at least in two different directions, thereby further ensuring fixation.

Members, such as connectors, for electrically connecting the solar cell modules with each other are arranged beneath the solar cell module fastener members so as not to be exposed to sunlight. Accordingly, weatherproof materials do not have to be employed and the cost can be reduced. At the same time, not only is the external appearance of the installation good, but also attachment and detachment of the connectors for electrically connecting the adjacent solar cell modules with each other can be facilitated.

Also, the waterproof seal members provided between the solar cell module fastener members and the solar cell modules prevent rain water from coming into the solar cell elements through the edge portions of the solar cell modules and producing a deleterious effect on said solar cell elements. Further, if the members such as the connectors for electrically connecting the solar cell modules with each other are provided beneath the module fastener members as described above, said connecting members do not get wet by the rain, thereby preventing leakage caused by the connecting members and material deterioration thereof.

Besides, the solar cell module according to the present invention can be applied to various kinds of well-known roof rafters such as folded plates, batten seam roofs, and so on.

BRIEF DESCRIPTION OF THE DRAWINGS

FIG. 4 is a view showing a cross-section, along the direction vertical to the slope of the first embodiment of the solar cell module according to the present invention which is fixed to the roof rafter.

FIG. 5 is a schematic cross-sectional view of the first embodiment of the solar cell modules according to the present invention which are fixed to the roof rafters.

DETAILED DESCRIPTION OF THE PREFERRED EMBODIMENTS

Figure 1:
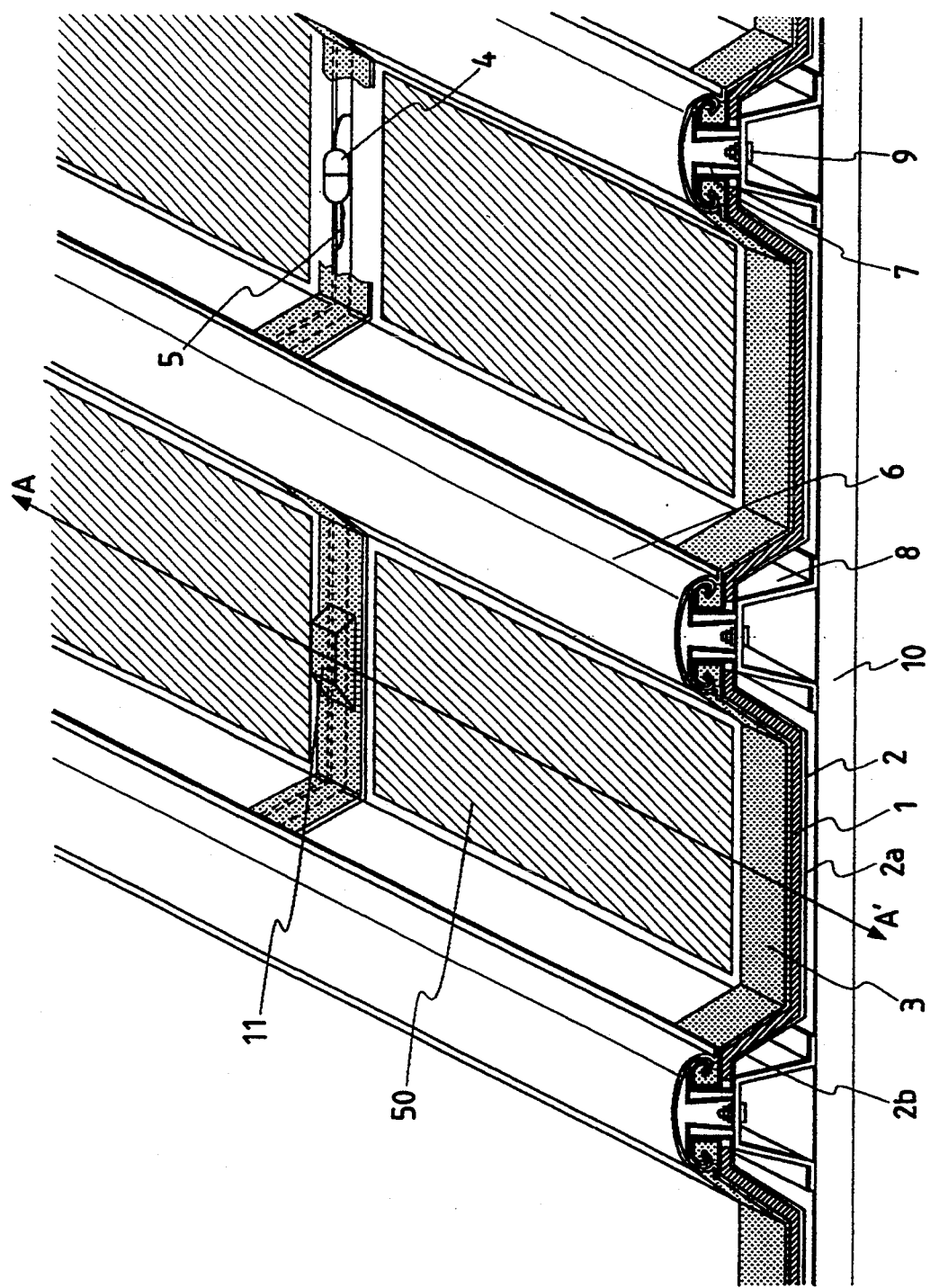
FIG. 1 is a schematic view showing an example of solar cell modules according to the present invention which are fixed to the roof rafters.
Figure 2:
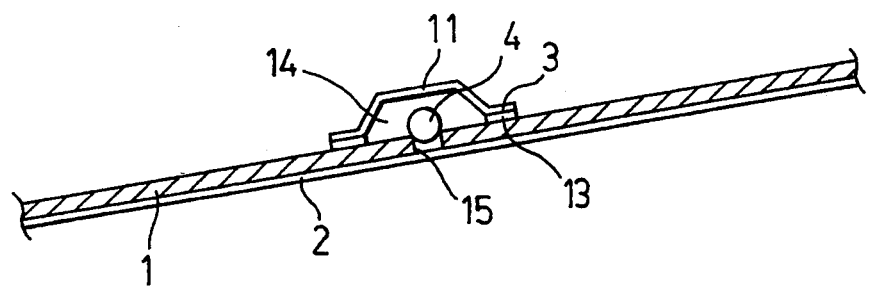
FIG. 2 is a schematic view showing a cross-section, along A—A' in FIG. 1, of the solar cell modules according to the present invention which are fixed to the roof rafters.
Figure 3:
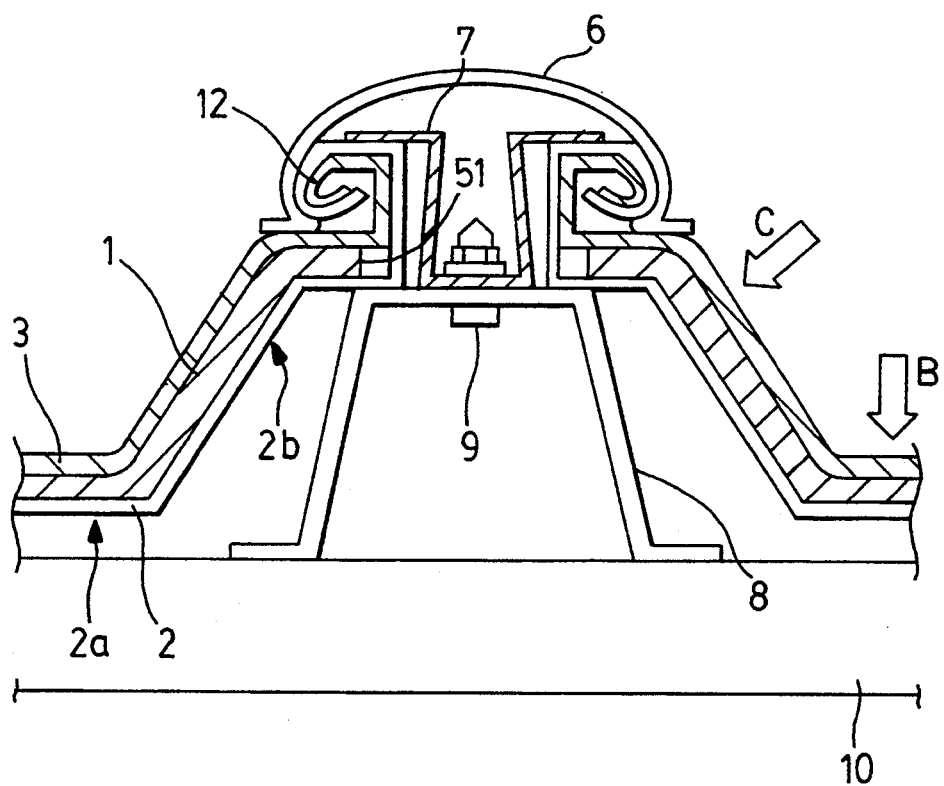
FIG. 3 is an enlarged view showing a rising portion of the roof rafters to which the solar cell modules according to the present invention are fixed.

FIGS. 1, 2, and 3 show an example in which the solar cell modules are held and fixed to metal roof rafters with solar cell module fastener members. FIG. 1 is a perspective view of the example according to the present invention, FIG. 2 is a sectional view cut along the line A—A' in FIG. 1, and FIG. 3 is a enlarged view showing the configuration of a rising portion of the roof rafter.

In FIGS. 1, 2, and 3, reference numeral 1 denotes the solar cell module, 2 denotes the roof rafter, 3 denotes a solar cell module fastener member, and 4 and 5 denote the connector and the cable, respectively, which serve as the members for electrically connecting the solar cell modules with each other. Reference numeral 6 denotes a cap member, 7 denotes a bracket, 8 denotes a frame, 9 denotes a tie bolt, and 10 denotes a purlin.

The roof rafters 2 used in this example according to the present invention are constructed according to a method similar to the known folded plate construction method. The procedure for preparation of the solar cell module of this example which is united with the roof rafter, including the above folded plate construction method, will be briefly described below.

First, flexible solar cell modules 1 are mounted on the flat portions 2a and the rising portions 2b of the roof rafters 2, and are connected with the connectors 4 so as to be electrically connected with the adjacent solar cell modules.

Then, the solar cell module fastener members 3 are mounted at positions where modules are adjacent to each other so that said connectors 4 may be properly contained beneath the connector receptacles 11 formed in the middle of respective solar cell module fastener members 3. As shown in FIG. 3, the edge portions of the fastener members 3 and those of the rising portions 2b of the roof rafters 2 are bent together in order to fix the solar cell module fastener members 3 to the roof rafters 2, thereby holding and fixing the solar cell modules 1 between the roof rafters 2 and the solar cell module fastener members 3. Incidentally, in this example, the solar cell modules mounted on the lower end of the roof rafters (that is, those aligned along the eaves) are electrically connected with each other under the eaves through holes which are drilled through the roof rafters. Accordingly, the lower edge portions of the solar cell modules on the eaves, where the connectors are not provided, are fixed by the solar cell module fastener members without the connector receptacles 11.

Next, the edge portions of the roof rafters and those of the solar cell module fastener members are held by the brackets 7, which are, in turn, fixed to the frames 8 with tie bolts 9. The frames 8 are fixed to the purlin 10 with bolts (not shown). Finally, the caps 6 are fitted so as to cover the edge portions of the roof rafters and those of the solar cell module fastener members.

In this case, as shown in FIG. 3, the solar cell modules 1 are held and fixed not only by the force in the direction indicated by the arrow B but also by the force in the direction indicated by the arrow C and the direction symmetrical thereto with respect to the rising portions, thereby further ensuring fixation.

And, as shown in FIG. 2, since waterproof sealing members 13 are provided under the solar cell module fastener members 3, rainwater cannot enter the inner space 14 through the edge portions 15 of the solar cell modules, through which moisture could otherwise easily enter inside. Accordingly, deleterious effects on the solar cell elements caused by moisture as well as deterioration of the connectors and the cables can be prevented.

In this example of the present invention, double sided pressure sensitive adhesive coated tape whose base body has a thickness of 1 mm and which contains closed cells of acrylic foam is used as the waterproof sealing members 13. Since the double coated tape contains bubbles which are not communicated with each other, it can exhibit a sufficient waterproofing function to act as sealing members. Also, since the waterproof sealing members 13 are made of double sided adhesive tape, the solar cell module fastener members 3 and the solar cell modules 1 are fixed to each other, thereby further ensuring fixation of the solar cell modules 1.

The present invention is not limited to the above-mentioned example. Now, each component will be described below.

Solar Cell Module

Preferably, the solar cell modules employed in the present invention are mounted on both the flat portions and the rising portions of the roof rafters, as described above, and thus, are preferably flexible. Accordingly, as the solar cell module to be employed in the present invention, a solar cell element which comprises a flexible, conductive substrate, on which an amorphous silicon semiconductor layer serving as a photoelectric transfer member is formed, is preferably used. The front surface of this solar cell element on which light is incident is coated with a weather-proof, flexible and transparent material, including: fluororesin film/EVA (ethylene-vinyl acetate copolymer) having a two-layer structure in which a fluororesin film is the front surface on which light is incident; silicone resin; fluororesin; acrylic silicone; polyester; nylon, etc. Glass nonwoven fabric cloth may be sandwiched between said resins in order to protect the module.

As a backing material, any flexible material such as EVA may be employed.

Though, in this example, the power generation region 50 of the solar cell module indicated by the slanted lines is arranged over the flat potion of the roof rafter, the power generation region may be extended over the rising portions of the roof rafters so as to have a larger light receiving surface, thereby making good use of the roof surface.

Panel for Mounting the Solar Cell Module

Though, in this example according to the present invention, a plurality of solar cell modules are arranged in one line on each roof rafter serving as the base member, they may be arranged in several lines so as to easily obtain desirable combinations with respect to voltage and make good use of the roof surface.

Also, the solar cell modules may be arranged with their edge portions overlapping each other: the lower edge portion of the upper module (nearer to the ridge) is laid over the upper edge portion of the lower module (nearer to the eaves). In this case, as the upper edge portion of the lower solar cell module on the eave side is pressed down by the upper solar cell module on the ridge side, only the lower edge portions of the solar cell modules have to be held and fixed by the solar cell module fastener members.

The edge portions 51 parallel with the slope of the roof are preferably protected by members such as the caps 6 provided to the rising portions of the roof rafters so as to be protected during installation and maintenance work.

Base

According to the present invention, any weather-proof material can be used for the base, including: a galvanized iron plate; a galvanized steel plate; a galvanized iron or steel plate coated with a weather-proof material such as fluororesin or vinyl chloride; a titanium plate; a stainless steel plate; a ceramic plate; a weather-proof resin sheet; and so on.

The cross-sectional form of the roof rafters according to the present invention preferably has flat portions and rising portions, as described above. For example, long roof rafters used with standing seam roofing such as the folded plate construction method, the batten seam roofing method, and the like, are preferable. However, the roof rafters are not limited thereto.

Solar Cell Module Fastener Member

The solar cell module fastener members used in the present invention are preferably made of weather-proof material with sufficient rigidity to hold and fix the solar cell modules, and are preferably applied to the above-described bending process. For example, a galvanized iron plate, a galvanized steel plate, a galvanized iron or steel plate coated with weather-proof material such as fluororesin, vinyl chloride, and the like, a titanium plate, a stainless steel plate, and so on, may be used.

If the fastener members are fixed on the roof rafters without bending, the material to be used is not limited to those described above, but may be any material having sufficient rigidity as described before. For example, a weather-proof resin such as silicone resin, glass, ceramics, carbon fiber, and the like may be employed.

The solar cell module fastener members according to the present invention are preferably formed so as to hold the solar cell modules on the flat portions and the rising portions of the roof rafters, and to be fixed to the rising portions of the roof rafters, as described before. Further, the solar cell module fastener members preferably have a form capable of being fitted to the sectional form of the roof rafters so that rainwater running over the flat portions of the roof rafters does not stagnate.

Further, though in this example one fastener member is provided to each roof rafters, one long fastener member may be provided to a plurality of adjacent roof rafters.

In addition, the position and the shapes of the connector receptacles for holding the connectors beneath the solar cell module fastener members are not limited exclusively to the middle portions of the fastener members nor to the convex shape shown in FIG. 1. For example, if the connectors are arranged in the boundary portions between the flat portions and the rising portions of the roof rafters, the connector receptacles do not have to be formed in the middle of the stopper members, thereby improving the external appearance. Or, if concave channels are formed in the roof rafters at positions where the connectors are arranged, the protrusions of the connector receptacles can be smaller or even removed. Further, when a long fastener member is attached to a plurality of adjacent roof rafters, the connectors can be arranged on the rising portions of the roof rafters, and the connector receptacles are formed in the fastener member at positions corresponding to said connectors on the rising portions.

Mounting of Solar Cell Module Fastener Member on Roof Rafter

The solar cell module fastener members used in the present invention are fixed to the roof rafters preferably in a way such that they are certainly fixed by the mechanical force to the rising portions of the roof rafters, which can be easily carried out without drilling holes through the roof rafters according to the method of fixation employed in the example of the present invention. Yet, the method of fixation is not limited thereto, but includes a method in which the fastener members and the roof rafters are further held and fixed by means of nipping fastener members, a method in which fasteners such as bolts for fixing the roof rafters are used to fix the solar cell module fastener members, a method in which the fastener members and the roof rafters are welded to each other, etc.

Auxiliary Fixation of Solar Cell Module

In order to further ensure fixation of the solar cell modules by holding and fixing the solar cell module fastener members and the roof rafters, auxiliary fixation may be performed, wherein the roof rafters and the solar cell modules, and the solar cell module fastener members and the solar cell modules are fixed to each other in the following ways.

Auxiliary fixation can be performed by: using double sided pressure sensitive adhesive coated tape: mechanical fixation with fastener members such as rivets; using silicone resin adhesive, etc.; a method in which magnets are attached to or embedded in the solar cell modules in order to fix the modules magnetically; etc. Also, a combination of the above-mentioned methods of fixation may be employed.

Waterproof Sealing Member

The waterproof sealing members used in the present invention need not be particularly specified. As the material of the sealing members, silicon resin, acrylic resin, and the like may be used. And, the waterproof sealing members may adhere to either the solar cell module fastener members or the solar cell modules, or may also adhere to both.

Further, materials such as sealing materials and adhesive materials which are cured from liquid to solid may be used.

Photoelectric Conversion Element

Figure 10:
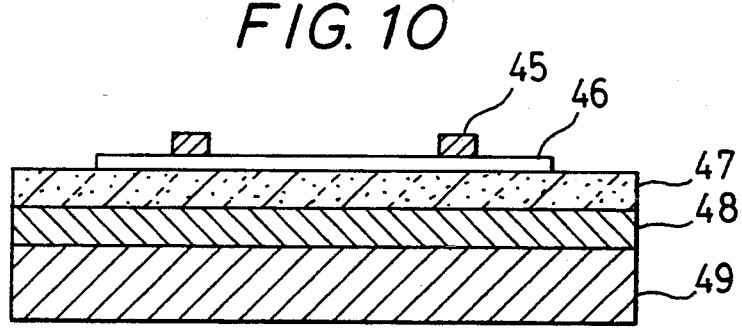
FIG. 10 is a schematic cross-sectional view showing an example of a photovoltaic element employed in the solar cell module according to the present invention which is united with the roof rafters.
Figure 9:
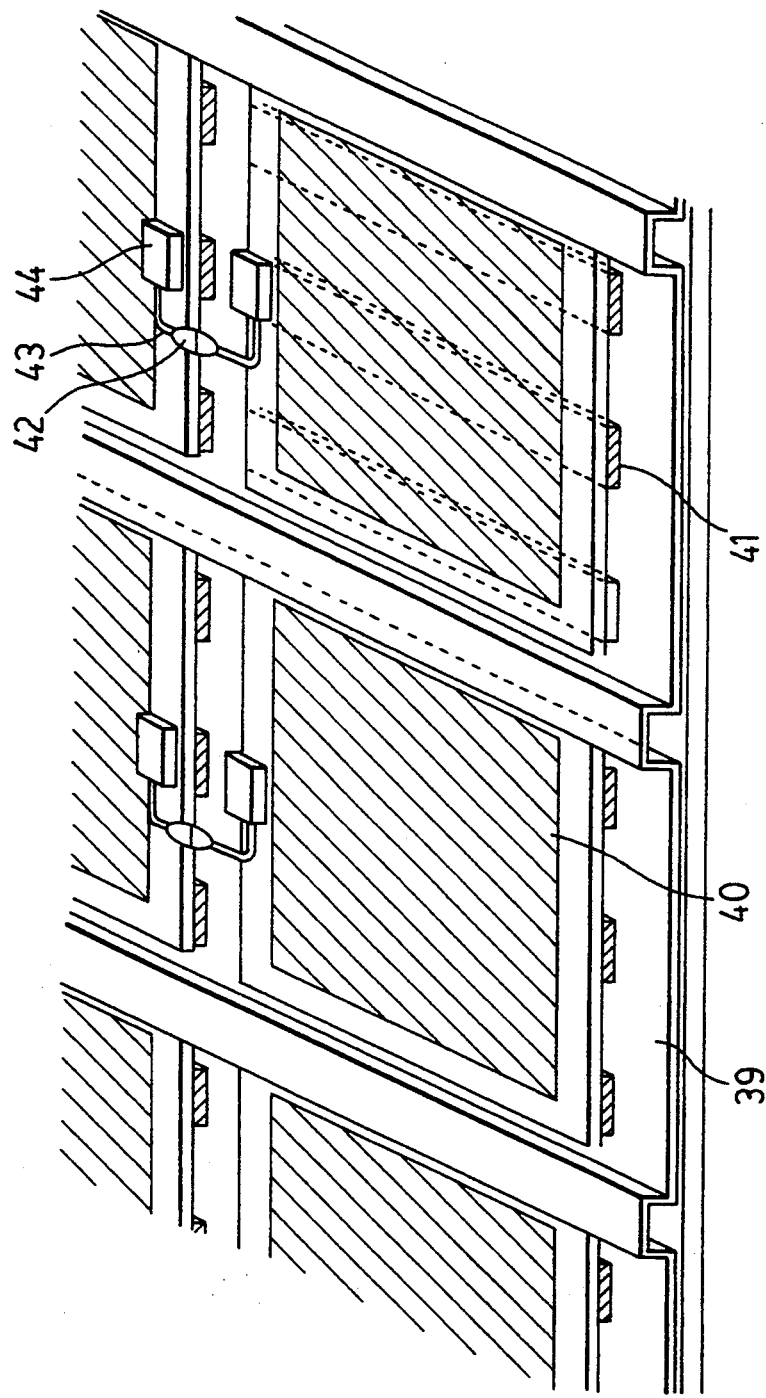
FIG. 9 is a view showing an example of installation in which the solar cell modules are directly fixed to the roof rafters, as compared with the present invention.

The solar cell module used in the panel according to the present invention which is united with the roof rafter consists of at least one photoelectric conversion element, which may be a tandem cell or a triple cell. FIG. 10 is a schematic cross-sectional view showing an example of the constitution of the solar cell module. In FIG. 10, reference numeral 49 indicates a conductive substrate, 48 indicates a back electrode layer, 47 is a semiconductor layer serving as a photoelectric conversion member, 46 is a transparent conductive layer, and 45 indicates collecting electrodes. The conductive substrate 49 may also serve as a reflecting back surface of the back electrode layer 48.

Said conductive substrate 49 can be made of: molybdenum, tungsten, cobalt, chromium, iron, tantalum, zirconium, stainless steel, aluminum, copper, titanium, a carbon sheet, a galvanized sheet steel of an alloy of the above-mentioned metals, a film or a plate of resin such as polyimide, polyester, polyethylene naphthalide, and epoxy coated with a conductive layer; and so on.

As said thin film semiconductor layer 47, an amorphus silicon semiconductor, a crystalline silicon semiconductor, a compound semiconductor such as copper indium selenite, or the like may be used. Especially, a thin film amorphous silicon semiconductor is preferable. The amorphous silicon semiconductor can be formed by reacting a mixture of silane gas and a dopant gas selected to obtain a desired conductivity type by the plasma CVD method. The polycrystalline silicon semiconductor can be formed by forming a sheet from fused silicon, heat treatment of an amorphous silicon semiconductor, etc. A $CuInSe_2/CdS$ heterojunction can be formed by electron beam deposition, sputtering, electrolytic deposition (in which electrolysis of an electrolyte is performed), etc. The semiconductor layer 47 is sandwiched between at least the back electrode layer 48 and the transparent electrode layer 46. As the back electrode layer 48, a metal layer, a metal oxide layer, or a laminate of metal and metal oxide is used. Metals used here include Ti, Al, Ag, Ni, Fe, Cu, Cr, Mo, etc., and usable metal oxides include ZnO, $TiO_2$, $SnO_2$, ITO, and the like. The metal layer and the metal oxide layer can be formed by resistance heating deposition, electron beam deposition, sputtering, spraying, CVD, impurity diffusion, etc. As the material for the grid type collecting electrodes 45 provided on the transparent conductive layer for effectively collecting the current generated by the photoelectromotive force, a conductive metal can be used, including Ti, Cr, Mo, W, Al, Ag, Ni, Cu, Sn, Ag, etc. Methods of forming the grid type electrodes include: deposition methods such as sputtering using mask patterns, resistance heating, CVD, etc.; a method in which a metal layer deposited over the entire surface is etched to obtain a pattern; a method of directly forming a pattern of the grid electrode by photochemical vapor deposition; a method in which a negative pattern mask of the grid electrode is formed and coating is performed through the mask; a method of printing conductive paste: and so on. A typical conductive paste contains: fine powder of Au, Ag, Cu, Ni, or C; fine powder of an alloy thereof; or a mixture thereof, which is dispersed in a polymeric binder. As the polymeric binder, resins are used, including polyester resin, epoxy resin, acrylic resin, alkyd resin, poly vinyl acetate, rubber, urethane, phenolic resin, etc.

As the material of a bus bar for concentrating and transmitting the current collected by the grid electrode, tin, solder coated paper, solder coated nickel, etc., can be used. The bus bar is connected with the grid electrode by soldering or with a conductive adhesive agent.

Embodiment 1

In this embodiment, the solar cell modules are mounted on the metal roof rafters of batten-seam roofing type, the modules are fixed end-to-end by the solar cell module fastener members.

FIGS. 4 and 5 show the solar cell modules of this embodiment which are united with the roof rafters. FIG. 4 is a cross-sectional view cut along the direction vertical to the slope of the roof, and FIG. 5 shows a cross section cut along the direction of the slope.

In this embodiment, reference numerals 16a and 16b denote solar cell modules, 17a, 17b, and 17c denote metal roof rafters, 18 is the solar cell module fastener member, 19 is the waterproof sealing members, 20 is the connector, and 21 denotes the roof sheathing.

The metal roof rafters 17 of the batten-seam roofing type employed here are galvanized sheet steel (55% aluminum-zinc alloyed iron plate) having a thickness of 0.4 mm. Each flexible solar cell module 16 consists of a stainless steel substrate and amorphous silicon semiconductor element(s) formed on said substrate and sealed with resin. The light incident surface of the solar cell module is covered with a fluororesin film and the back surface thereof is covered with a laminated film in which an aluminum foil is sandwiched between fluororesin films. Between the amorphous silicon semiconductor element(s) and the films covering its front and back surfaces, EVA (ethylene-vinyl acetate copolymer) is filled as adhesive layers. The above-mentioned laminated structure is prepared by the vacuum lamination method.

Thus prepared solar cell modules 16 are installed so that the upper solar cell module 16a nearer to the ridge is laid on part of the lower solar cell module 16b nearer the eaves and both the solar cell modules 16a and 16b cover the rising portions 17b of the roof rafter.

In this case, the solar cell modules 16 in this embodiment were prepared so as to have the power generation regions in the area D shown in FIG. 4.

Next, the two solar cell modules were electrically connected with each other through a cylindrical waterproof connector 20, which was placed in the boundary portion between the flat portion 17a and the rising portion 17b of the roof rafter.

Subsequently, the waterproof sealing members 19 of double sided pressure sensitive adhesive coated tape whose substrate had a thickness of 1 mm and which contained closed cells of acrylic foam were adhered to the solar cell module fastener member 18. Then, the fastener member 18 was mounted so that the connector 20 could be contained properly in the connector receptacle 22, and was fixed by bending its edge portions with the edge portions of the rising portions 17b of the roof rafter.

In this embodiment, as the fastener member 18, galvanized sheet steel (55% aluminum—galvanized iron plate) having a thickness of 1 mm was used.

The photoelectromotive force element was prepared according to the following procedure.

A layer of Al/ZnO serving as the reflecting back layer was formed on a stainless steel substrate having a thickness of 0.125 mm by the sputtering method. Then, by the plasma CVD method, an n-type- a-Si semiconductor layer, an i-type- a-Si semiconductor layer, and a p-type- crystalline Si semiconductor layer were formed in this order. After that, a layer of $In_2O_3$ serving as the transparent electrode layer was deposited under an $O_2$ atmosphere by the resistance heating method to complete the photoelectromotive force element. Further, screen printing of silver paste serving as the collecting electrodes was performed to form the solar cell element, which is an amorphous silicon photoelectromotive element.

Embodiment 2

Figure 6:
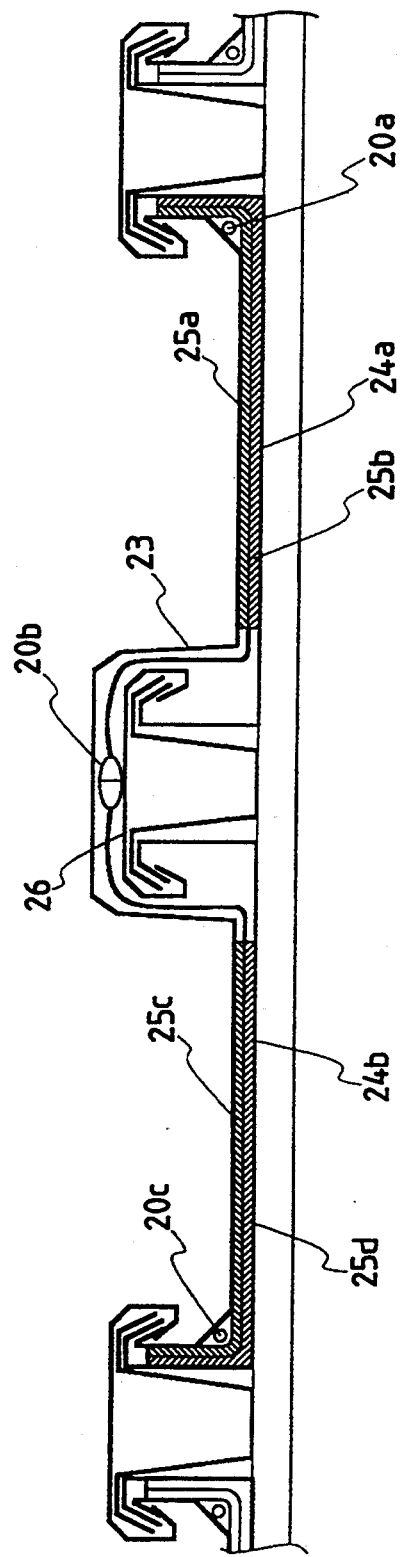
FIG. 6 is a cross-sectional view showing the second embodiment of the solar cell modules according to the present invention which are fixed to the roof rafters.

In this embodiment shown in FIG. 6, the solar cell modules are also arranged on the metal roof rafters of batten-seam roofing type, as in Embodiment 1. However, in this embodiment the solar cell modules mounted on two adjacent roof rafters are also held and fixed by a solar cell module fastener member.

The solar cell module fastener member 23 in this embodiment holds and fixes the solar cell modules 25a and 25b as well as the solar cell modules 25c and 25d respectively mounted on the adjacent metal roof rafters 24a and 24b.

In this case, the solar cell modules 25a and 25b are electrically connected through a waterproof connector 20a, the solar cell modules 25b and 25c are electrically connected through a waterproof connector 25b, and modules 25c and 25d are electrically connected through a connector 20c. As shown in FIG. 6, the waterproof connector 20b is arranged on the cap 26 provided in the rising portion of the roof rafter, and is contained in the fastener member 23.

Note that, if not mentioned in particular, the procedure, methods, etc. in this embodiment, for example, the material of the roof rafters, are the same as those in Embodiment 1.

Embodiment 3

Figure 7:
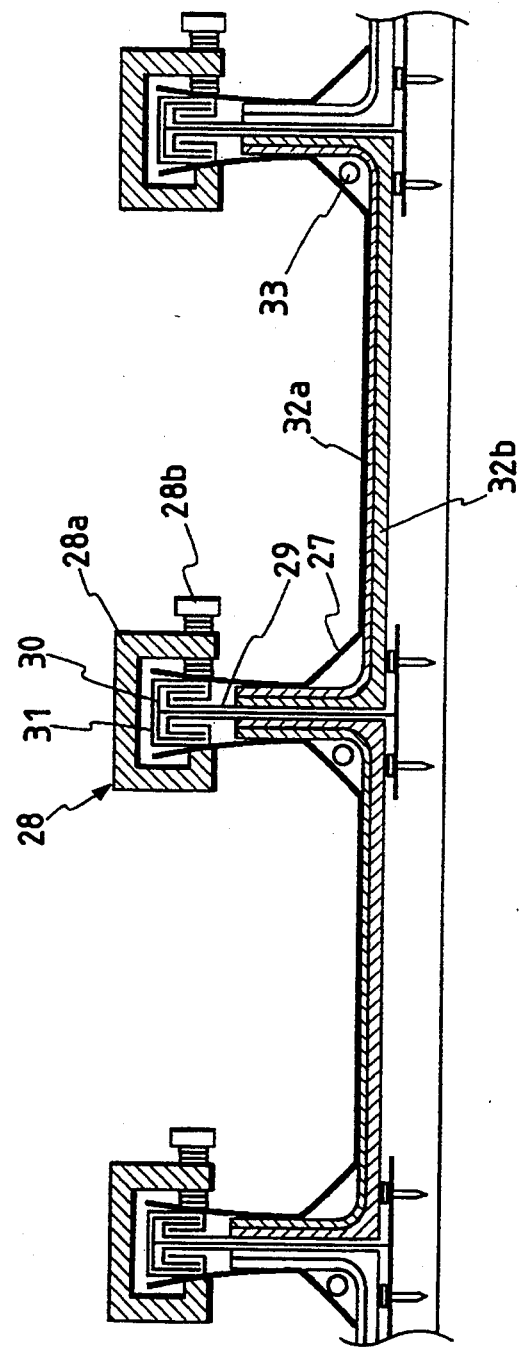
FIG. 7 is a schematic cross-sectional view showing the third embodiment of the solar cell modules according to the present invention which are fixed to the roof rafters.
Figure 8:
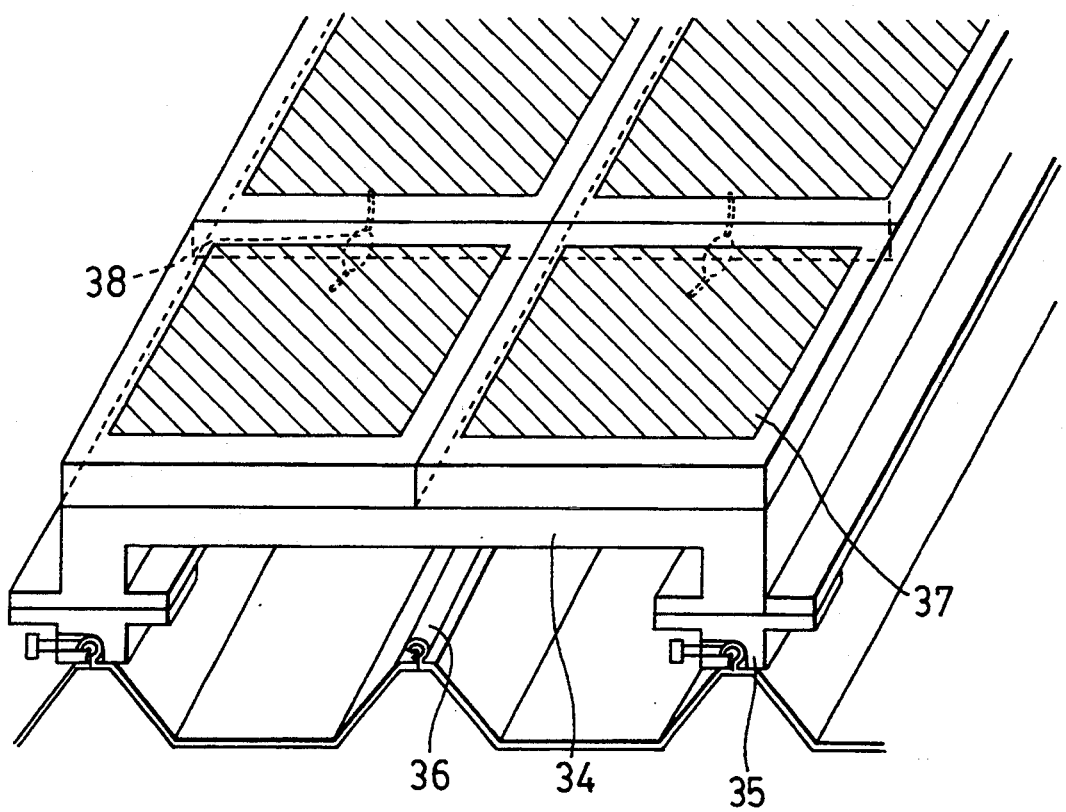
FIG. 8 is a view showing an example of using a solar cell installation base, shown for comparison with the present invention.

In this embodiment shown in FIG. 7, the solar cell modules are arranged on the metal roof rafters of the standing seam roofing type, and are held and fixed by the solar cell module fastener members.

In this embodiment, reference numerals 32a and 32b denote the solar cell modules, 33 denotes the waterproof connectors, which are similar to those in Embodiment 1. The solar cell module fastener member 27 used in this embodiment is fixed on the metal roof rafter 29 not only by the bracket 30 and the cap 31 provided in the rising portion but also by a gripping type fastener member 28.

The gripping fastener member 28 consists of an aluminum gripping base 28a and a bolt 28b engaged therewith, wherein the gripping fastener member grips and fixes the solar cell module fastener member when the bolt 28b is tightened.

Note that, if not mentioned in particular, the procedure, methods, and so on in this embodiment, for example, the material of the roof rafters, are the same as those in Embodiment 1.

As described above, the solar cell module panel which is united with the roof rafters, wherein the solar cell modules are mounted and fixed on the roof rafters, comprises: a plurality of solar cell modules; connecting units for electrically connecting said solar cell modules with each other; and solar cell module fastener members which can contain said connecting units. The edge portions of the solar cell modules are held and fixed between the roof rafters and the solar cell module fastener members fixed to the roof rafters. Accordingly, the following effects can be obtained.

As a base for installation of the solar cell modules is not required, the facility and safety of the work can be remarkably improved, and the cost can be reduced. And because the edge portions of the solar cell modules are fixed and protected by the solar cell module fastener members, the solar cell modules are not mechanically peeled especially during installation and maintenance work, and long term reliability is improved.

Further, by fixing the solar cell module fastener members to the rising portions of the sectional form of the roof rafters, the solar cell modules can be easily fixed without drilling holes through the roof rafters or the solar cell modules so that the delamination does not occur and moisture is prevented from entering through holes.

In addition, since the solar cell modules are flexible and are held and fixed to both the flat portions and the rising portions of the roof rafters, fixation is further ensured.

As the members such as the connectors for electrically connecting the solar cell modules with each other are arranged beneath the solar cell module fastener members so as not to be exposed to sunlight, weatherproof material does not have to be used and the cost can be reduced. Also, the external appearance of the installation is good.

Furthermore, because waterproof sealing members are provided between the solar cell module fastener members and the solar cell modules, rainwater does not come into the solar cell elements through the edge portions of the solar cell modules, and deleterious effects on the solar cell elements can be prevented. Further, if the members such as the connectors for electrically connecting the solar cell modules with each other are provided beneath the module fastener members as described above, said connecting members do not get wet by the rain, thereby preventing leaks caused by the connecting members and deterioration of the material thereof.

What is claimed is:

1. A solar cell module panel comprising:
    a substrate;
    a plurality of solar cell modules formed on said substrate;
    connecting members for electrically connecting said solar cell modules with each other; and
    fastener members for mounting said solar cell modules to a roof structure,
    wherein said connecting members are contained in said fastener members, and edge portions of said solar cell modules are held between said substrate and said fastener members which are fixed thereto.

2. A solar cell module panel according to claim 1, wherein a cross-sectional form of said substrate has flat portions and rising portions, and said fastener members are fixed to said rising portions.

3. A solar cell module panel according to claim 2, wherein said solar cell modules are flexible and are fixed to both said flat portions and said rising portions of said substrate.

4. A solar cell module panel according to claim 1, wherein water proof sealing members are provided between said solar cell module fastener members and said solar cell modules.

5. A solar cell module panel according to claim 1, including magnets for assisting fixation of said solar cell modules to said roof structure.

6. A solar cell module panel according to claim 1, wherein said solar cell modules are adhered to said substrate, by means including double-sided pressure sensitive adhesive coated tape.

* * * * *

UNITED STATES PATENT AND TRADEMARK OFFICE
CERTIFICATE OF CORRECTION

PATENT NO. : 5,409,549
DATED : April 25, 1995
INVENTOR(S) : Mori

It is certified that error appears in the above-indentified patent and that said Letters Patent is hereby corrected as shown below:

COLUMN 1:

Line 30, "protruberances 36, "should read
--protuberances 36,--.

Signed and Sealed this

Twelfth Day of September, 1995

Attest:

BRUCE LEHMAN

Attesting Officer     Commissioner of Patents and Trademarks